US010812550B1

(12) United States Patent
Wells et al.

(10) Patent No.: US 10,812,550 B1
(45) Date of Patent: Oct. 20, 2020

(54) BITRATE ALLOCATION FOR A MULTICHANNEL MEDIA STREAM

(71) Applicant: Amazon Technologies, Inc., Seattle, WA (US)

(72) Inventors: Trevor Wells, Washougal, WA (US); Jeffrey Lassahn, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 469 days.

(21) Appl. No.: 15/227,806

(22) Filed: Aug. 3, 2016

(51) Int. Cl.
*H04L 29/06* (2006.01)

(52) U.S. Cl.
CPC .......... *H04L 65/60* (2013.01); *H04L 65/4069* (2013.01); *H04L 65/80* (2013.01)

(58) Field of Classification Search
CPC ...... H04L 65/60; H04L 65/4069; H04L 65/80
See application file for complete search history.

(56) References Cited

U.S. PATENT DOCUMENTS

| | | | |
|---|---|---|---|
| 6,847,656 B1 * | 1/2005 | Wu ................. | H04N 21/23608 370/477 |
| 6,859,496 B1 * | 2/2005 | Boroczky ........ | H04N 21/23655 375/240 |
| 6,947,486 B2 | 9/2005 | Akhan et al. | |
| 7,027,982 B2 * | 4/2006 | Chen ................... | G10L 19/002 375/240.05 |
| 7,200,276 B2 | 4/2007 | Mehrotra | |
| 7,277,848 B2 * | 10/2007 | Chen ................... | G10L 19/002 375/240 |
| 8,179,981 B2 | 5/2012 | Chen et al. | |
| 8,300,541 B2 * | 10/2012 | Cholas .............. | H04L 12/2801 370/252 |
| 8,612,240 B2 * | 12/2013 | Fuchs ................ | G10L 19/0017 704/500 |
| 8,918,535 B2 | 12/2014 | Ma et al. | |
| 8,934,538 B2 | 1/2015 | Yang et al. | |
| 9,014,048 B2 | 4/2015 | Pantelias | |
| 9,083,971 B2 | 7/2015 | Van Veldhuisen et al. | |
| 9,143,813 B2 | 9/2015 | Schlack | |
| 9,208,798 B2 | 12/2015 | Ward et al. | |

(Continued)

*Primary Examiner* — Patrice L Winder
*Assistant Examiner* — Angela M Widhalm de Rodrig
(74) *Attorney, Agent, or Firm* — Robert C. Kowert; Kowert, Hood, Munyon, Rankin & Goetzel, P.C.

(57) ABSTRACT

Methods, systems, and computer-readable media for bitrate allocation for a multichannel media stream are disclosed. Complexity values are determined for individual channels of a set of channels of a multichannel media stream. The complexity values are determined based (at least in part) on frames of the individual channels during a window of time. The multichannel media stream is associated with a maximum aggregate bitrate, and the individual channels are associated with minimum individual bitrates and maximum individual bitrates. Individual bitrates are determined for the individual channels based (at least in part) on the complexity values. The sum of the individual bitrates does not exceed the maximum aggregate bitrate beyond a predetermined threshold, and the individual bitrates fall between the minimum and maximum individual bitrates of the corresponding individual channels. The individual channels are encoded at bitrates approximating the corresponding individual bitrates and transmitted to one or more recipients.

20 Claims, 10 Drawing Sheets

(56) References Cited

U.S. PATENT DOCUMENTS

| | | | | |
|---|---|---|---|---|
| 9,461,918 B2* | 10/2016 | Cotter | .................... | H04L 47/125 |
| 9,888,052 B2* | 2/2018 | Botsford | ................ | H04L 65/607 |
| 10,002,621 B2* | 6/2018 | Disch | .................... | G10L 19/008 |
| 2006/0053020 A1* | 3/2006 | Chen | ..................... | G10L 19/002 |
| | | | | 704/503 |
| 2008/0052414 A1* | 2/2008 | Panigrahi | ......... | H04N 21/23439 |
| | | | | 709/246 |
| 2015/0131800 A1* | 5/2015 | Mundt | .................. | G10L 19/008 |
| | | | | 381/22 |
| 2016/0149815 A1* | 5/2016 | Cotter | ................ | H04L 43/0876 |
| | | | | 370/235 |

* cited by examiner

BITRATE ALLOCATION FOR A MULTICHANNEL MEDIA STREAM

BACKGROUND

Internet-based video streaming is increasingly the choice of viewers who seek convenient access to video outside of conventional video distribution channels (including over-the-air broadcasts, cable TV, satellite TV, and prerecorded physical media). Using streaming technologies, viewers may access channels of live video as well as prerecorded video from libraries of video assets that are accessible over an Internet connection. In some cases, streaming video is viewable on a wide range of devices, including desktop computers and laptop computers, tablets, smartphones, wearable computers, and specialized devices such as smart televisions. The flexibility and convenience of streaming video are responsible in part for its widespread adoption.

The distribution and delivery pipeline for streaming video is typically a complicated one. A video asset or live stream may first be acquired, e.g., from a broadcaster. The video may then be processed and transformed in any of several ways (potentially including compression, encryption, and other forms of encoding) for eventual distribution to viewers. A particular video asset or live stream may be compressed at a particular bitrate. A hierarchy of servers over a wide geographical area may be used to deliver the video to many viewers in an efficient manner. A viewer may then attempt to play the video on a viewing device.

Figure 1:
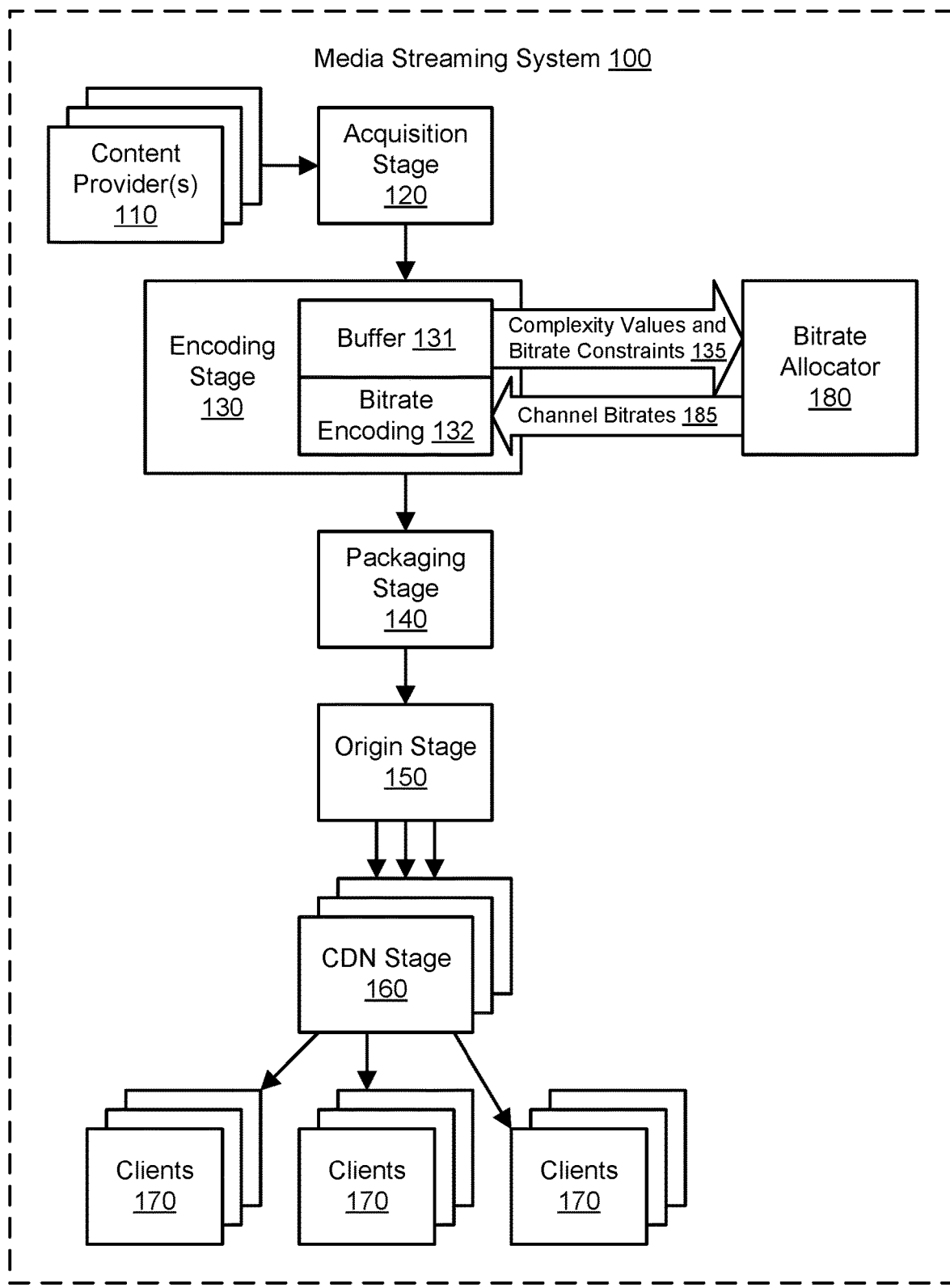
FIG. 1 illustrates an example system environment for bitrate allocation for a multichannel media stream, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for bitrate allocation for a multichannel media stream are described. Using the techniques described herein, a media streaming system may be implemented as part of a delivery pipeline for streaming media. The media streaming system may include a bitrate allocator and one or more encoders. The media streaming system may acquire (e.g., from a media source) a multichannel media stream that represents a package of multiple channels of streaming media (e.g., video with audio and potentially other data). The multichannel media stream is associated with one or more bitrate constraints such as a maximum aggregate bitrate, and the individual channels are associated with bitrate constraints such as minimum individual bitrates and maximum individual bitrates. A component of the media streaming system (e.g., the one or more encoders) may determine complexity values for the individual channels during a window of time. The complexity values may be determined based (at least in part) on the contents of frames of the individual channels, e.g., such that a more visually complex channel may be assigned a greater complexity value than a less visually complex channel. The complexity may be determined based (at least in part) on the degree of change from frame to frame within a channel. For example, a more dynamic and fast-moving channel may be assigned a greater complexity value than a largely static channel. A component of the media streaming system (e.g., the bitrate allocator) may determine individual bitrates for the individual channels based (at least in part) on the complexity values corresponding to the channels and subject to any bitrate constraints. The sum of the individual bitrates may not exceed the maximum aggregate bitrate plus a predetermined threshold, and the individual bitrates may fall between the minimum individual bitrates and the maximum individual bitrates of the corresponding individual channels. An iterative process may be used to determine the individual bitrates based (at least in part) on successive refinement of a global quality value within constraints based on the minimum and maximum individual bitrates. The individual channels may be encoded at bitrates approximating their corresponding individual bitrates and transmitted to one or more recipients, e.g., in a multiple program transport stream (MPTS).

FIG. 1 illustrates an example system environment for bitrate allocation for a multichannel media stream, according to one embodiment. A media streaming system 100 may implement a media delivery pipeline to stream media, such as digital video or audio or a combination thereof, to client computing devices 170 for playback on those devices. The media may represent live media content (e.g., a live stream associated with a particular channel) or prerecorded media content (e.g., a media asset from a library of streamable media). The pipeline may include multiple stages; the stages may represent various transformations of the media and/or various distribution paths for the media (e.g., from device to device over the internet). A media stream may comprise a multichannel media stream in which multiple channels of content are packaged together. The multiple channels may typically represent different content, and a recipient may select one of the channels from the multichannel stream (e.g., for viewing). Alternatively, a media stream may comprise a single channel of media. The bitrate allocation techniques described herein may be especially useful for optimizing the bitrates of different channels of a multichannel media stream of live content.

The client computing devices 170 may be associated with and/or operated by one or more clients of the media streaming system 100; as used herein, the terms "client computing device," "client device," and "client" may be used interchangeably. The client computing devices 170 may be coupled to portions of the media streaming system 100 via one or more networks, potentially including the Internet. A client may represent a customer (e.g., an individual or group) of the media streaming system 100. Typically, a user associated with one of the client computing devices 170 may have an account that has privileges to access media content provided by the media streaming system 100. The access may be fee-based or may instead be free to the user (potentially with advertisements in the streaming media or player software). However, some media may also be streamable to users without accounts or other arrangements, e.g., on websites that provide streaming video.

It is contemplated that the media delivery pipeline implemented by the media streaming system 100 may include various combinations of stages, including the particular combination illustrated in FIG. 1. In one embodiment, as shown in FIG. 1, the stages of the pipeline may include an acquisition stage 120, an encoding stage 130, and a packaging stage 140. At the acquisition stage 120, a signal representing the media may be acquired from one or more content providers 110, e.g., broadcasters. The signal may be acquired by the media streaming system 100 using any of several suitable transport mechanisms, including a camera feed, a microphone feed, an internet protocol (IP) connection, an asynchronous serial interface (ASI) connection, and so on. At the encoding stage 130, the media may be transformed into a particular video or audio format, e.g., using a particular codec. The encoding stage may be implemented by a plurality of components, referred to herein as encoders, that may operate in parallel. The encoders may differ in terms of the encoding tasks they perform. The encoding stage 130 may include compression, or a separate compression stage may be used in the pipeline. Additionally, at the encoding stage 130, the media may be divided into segments or chunks of a fixed or variable size. For example, the media may be divided into segments of approximately ten seconds in length for delivery via HTTP over TCP/IP.

In one embodiment, one or more components in the encoding stage 130 may include or interact with a bitrate allocator 180 to determine bitrates at which to encode channels of streaming media. One or more encoder components of the encoding stage 130 may supply the bitrate allocator 180 with information 135 such as complexity values representing the estimated visual or graphical complexity of different channels as well as bitrate constraints such as minimum bitrates and maximum bitrates for particular channels and a maximum aggregate bitrate for an entire set of channels (e.g., the channels in a multichannel stream). The complexity values may be determined for a set of channels during a window of time, e.g., based (at least in part) on the contents of frames of those channels and/or frame-to-frame changes for frames occurring within a particular time slice. The bitrate constraints may be configured by the content provider(s) 110. The bitrate constraints in the information 135 may also include average or nominal bitrates for the various channels, e.g., as supplied by the content provider(s) 110. Based (at least in part) on the information 135, the bitrate allocator 180 may determine bitrates 185 for different channels and supply those bitrates to the encoding stage 130, which may then encode the channels at their corresponding bitrates as determined by the bitrate allocator. The bitrates 185 may vary from channel to channel, e.g., such that more complex and/or dynamic channels may typically be assigned larger bitrates than less complex and/or more static channels. The bitrates 185 for a set of channels (e.g., the channels in a multichannel stream) may collectively fall within one or more global constraints for the set of channels, such as a maximum aggregate bitrate plus a predetermined threshold (e.g. an integer or percentage) beyond that maximum. For a given channel, the determined bitrate may also fall within a minimum bitrate and a maximum bitrate associated with that channel, potentially within some predetermined threshold value or percentage. In this manner, the bitrate allocator may optimize the bitrates for a set of channels or a package of channels. The bitrate allocation and subsequent encoding may be performed repeatedly over time for a multichannel stream. For example, the bitrate allocation may be performed at periodic intervals and/or at the front edge of particular frames to determine the bitrates at which a set of channels are encoded. In this manner, the bitrates for a particular channel may change over time.

One or more encoder components of the encoding stage 130 may include a buffer 131, also referred to as a lookahead buffer, that stores sequences of frames (e.g., of approximately 1.5 seconds in duration) for channels in a multichannel media stream prior to those frames being encoded at particular bitrates and sent to downstream stages. The lookahead buffer 131 may be used to store frames that are analyzed to determine the complexity of a particular channel within a window of time. In one embodiment, using a component 132 for encoding frames at particular bitrates, one or more frames of a channel may be encoded at a bitrate approximating the bitrate determined by the bitrate allocator 180. In one embodiment, successive frames in a channel may be encoded at different bitrates based on the results provided by the bitrate allocator 180.

At the packaging stage 140, the media may be packaged and multiplexed (or "muxed") for playback on particular playback software (referred to herein as a "player") and/or a particular type of client device (e.g., a particular category of smartphone). In one embodiment, additional stages of the pipeline may perform additional transformations of the media, such as encryption performed at an encryption stage, decoding performed at a decoding stage, framerate conversion performed at a framerate conversion stage, scaling performed at a scaling stage, advertisement insertion performed at an advertisement insertion stage, and/or other types of image processing (e.g., color transformation) performed at an image processing stage. Alternatively, one of the additional transformations may be performed as a sub-stage of another stage such as the encoding stage 130.

In one embodiment, as shown in FIG. 1, the stages may include an origin server stage (also referred to as an origin stage) 150 and a content delivery network (CDN) stage 160. The pipeline may include one or more origin servers and a larger number of CDN servers. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. At the origin server stage 150, the media may be sent from the origin server to one or more CDN servers. If other stages such as the acquisition stage 120, encoding stage 130, and/or packaging stage 140 are performed at the origin server, then the origin stage 150 may include those stages or include corresponding sub-stages. However, it is also contemplated that the origin server stage 150 may represent a distinct stage relative to the acquisition stage 120, encoding stage 130, and/or packaging stage 140. At the CDN stage 160, the media may be sent from a CDN server to a client device 170, e.g., as requested by the client device. In one embodiment, the stages may also include a playback stage that represents attempted playback by a player (e.g., implemented in player software) on a client device 170.

In some embodiments, components of the media streaming system 100 such as servers, storage resources, and network resources may be implemented using resources of a provider network. The provider network may be set up by an entity such as a company or a public sector organization to provide one or more services (such as various types of cloud-based computing or storage) accessible via the Internet and/or other networks to clients. The provider network may include numerous data centers hosting various resource pools, such as collections of physical and/or virtualized computer servers, storage devices, networking equipment and the like (e.g., implemented using the example computing system 3000 described below with regard to FIG. 8), needed to implement and distribute the infrastructure and services offered by the provider network. In some embodiments, the provider network may provide computing resources and services, such as services associated with the media streaming system 100; storage services, such as a block-based storage service, key-value based data stores, or various types of database systems; and/or any other type of network-based services. Clients may access these various services offered by provider network 100 via one or more networks, potentially including the Internet. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances.

The provider network may implement or provide a multi-tenant environment such that multiple clients (e.g., content providers 110 and/or end user clients 170) may access or use a particular resource or service in a substantially simultaneous manner. Functionality of all or part of the media streaming system 100, such as the bitrate allocator 180, may be offered to multiple clients (in a substantially simultaneous manner) in such a multi-tenant provider network, such that the same computational and storage resources associated with the media streaming system may be used on behalf of different clients over the same window of time. The different clients may represent different individuals and/or different organizations that may pay the provider network for access to one or more services and/or resources. The provider network may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network. In one embodiment, the fleet of servers may grow or shrink as individual servers are added to or removed from a dedicated fleet by an administrator.

The content providers 110 may be individuals or entities who provide streaming media content to the media streaming system 100 for potential delivery to the clients 170. The content providers 110 as illustrated in FIG. 1 may correspond to computing devices that are connected to the media streaming system 100 over one or more networks, potentially including the Internet. The computing devices associated with the content providers 110 may encompass any type of hardware and software that are configurable to submit requests to the media streaming system 100 (e.g., implemented using the example computing system 3000 described below with regard to FIG. 8). Similarly, the computing devices associated with the clients 170 may encompass any type of hardware and software that are configurable to consume streaming media provided by the media streaming system 100 (e.g., implemented using the example computing system 3000 described below with regard to FIG. 8). For example, a client computing device may include a dedicated media player, a suitable version of a web browser, and/or a plug-in module or other type of code module configured to execute as an extension to or within an execution environment provided by a web browser or other form of client software. In some embodiments, such a client application may include sufficient protocol support (e.g., for a suitable version of Hypertext Transfer Protocol [HTTP]) for generating and processing network-based service requests.

Content providers 110 and/or client computing devices 170 may convey network-based requests to the media streaming system 100 via one or more external networks. In various embodiments, the external network(s) may encompass any suitable combination of networking hardware and protocols necessary to establish network-based communications between computing devices and the media streaming system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given computing device and the media streaming system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the media streaming system 100. It is noted that in some embodiments, computing devices for content providers 110 and/or clients 170 may communicate with the media streaming system 100 using a private network in addition to or instead of the public Internet.

Figure 8:
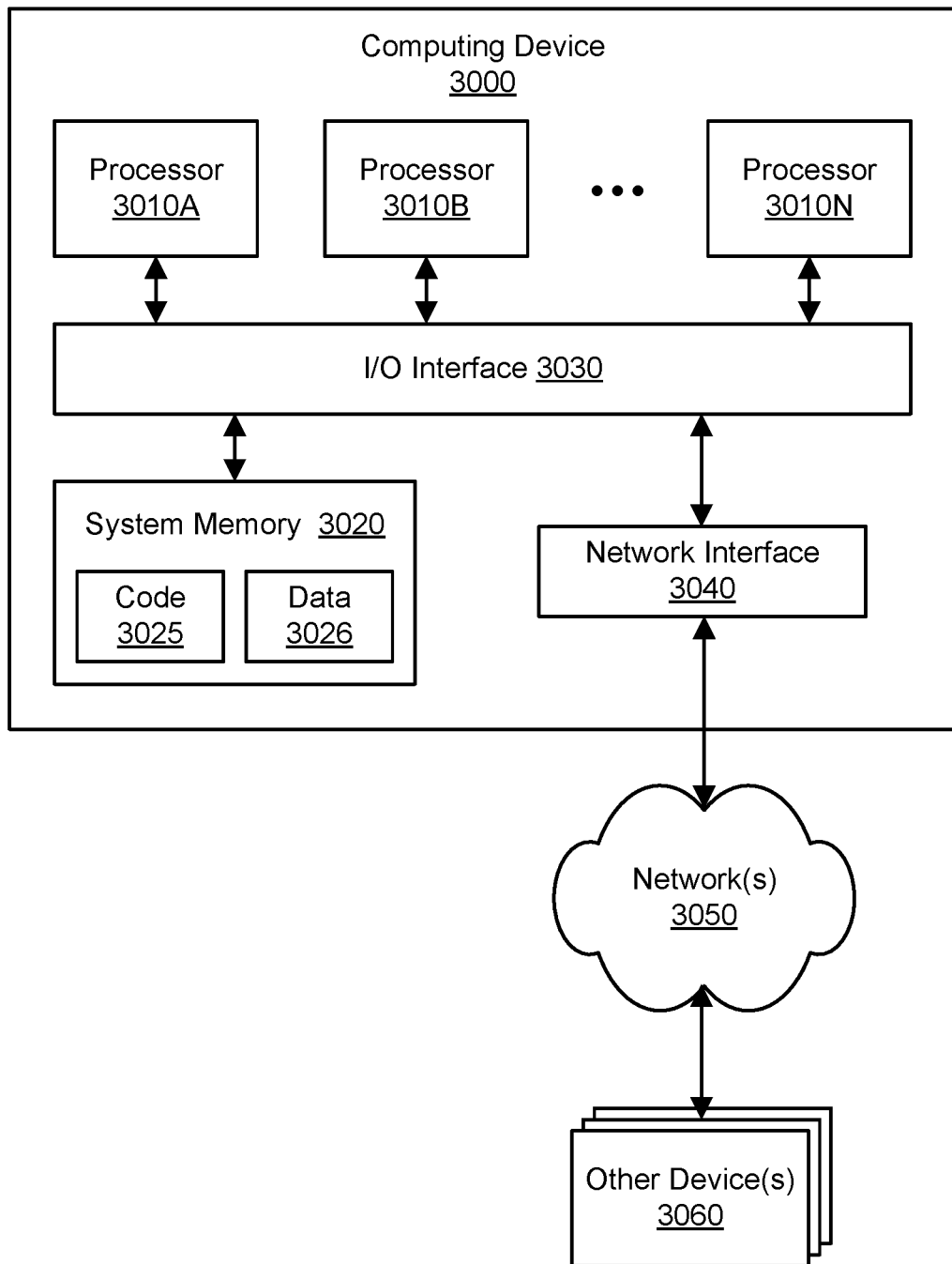
FIG. 8 illustrates an example computing device that may be used in some embodiments.

The media streaming system 100 may include a plurality of computing devices, any of which may be implemented by the example computing device 3000 illustrated in FIG. 8. In various embodiments, portions of the described functionality of the media streaming system 100 may be provided by the same computing device or by any suitable number of different computing devices. If any of the components of the media streaming system 100 are implemented using different computing devices, then the components and their respective computing devices may be communicatively coupled, e.g., via a network. Each of the illustrated components (such as the various stages 120, 130, 140, 150, and 160) may represent any combination of software and hardware usable to perform their respective functions. Multiple computing devices may typically be used to implement the multi-stage pipeline. In some circumstances, more than one stage may be performed by the same computing device.

It is contemplated that the media streaming system 100 may include additional components not shown, fewer components than shown, or different combinations, configurations, or quantities of the components shown. For example, although various stages such as stages 120, 130, 140, 150, and 160 are shown for purposes of example and illustration, it is contemplated that different quantities and configurations of stages may be used. Additionally, it is contemplated that some of the stages 120, 130, 140, 150, and 160 may include redundant components that collectively provide the functionality of the particular stage. Aspects of the functionality described herein may be performed, at least in part, by components outside of the media streaming system 100.

Figure 2:
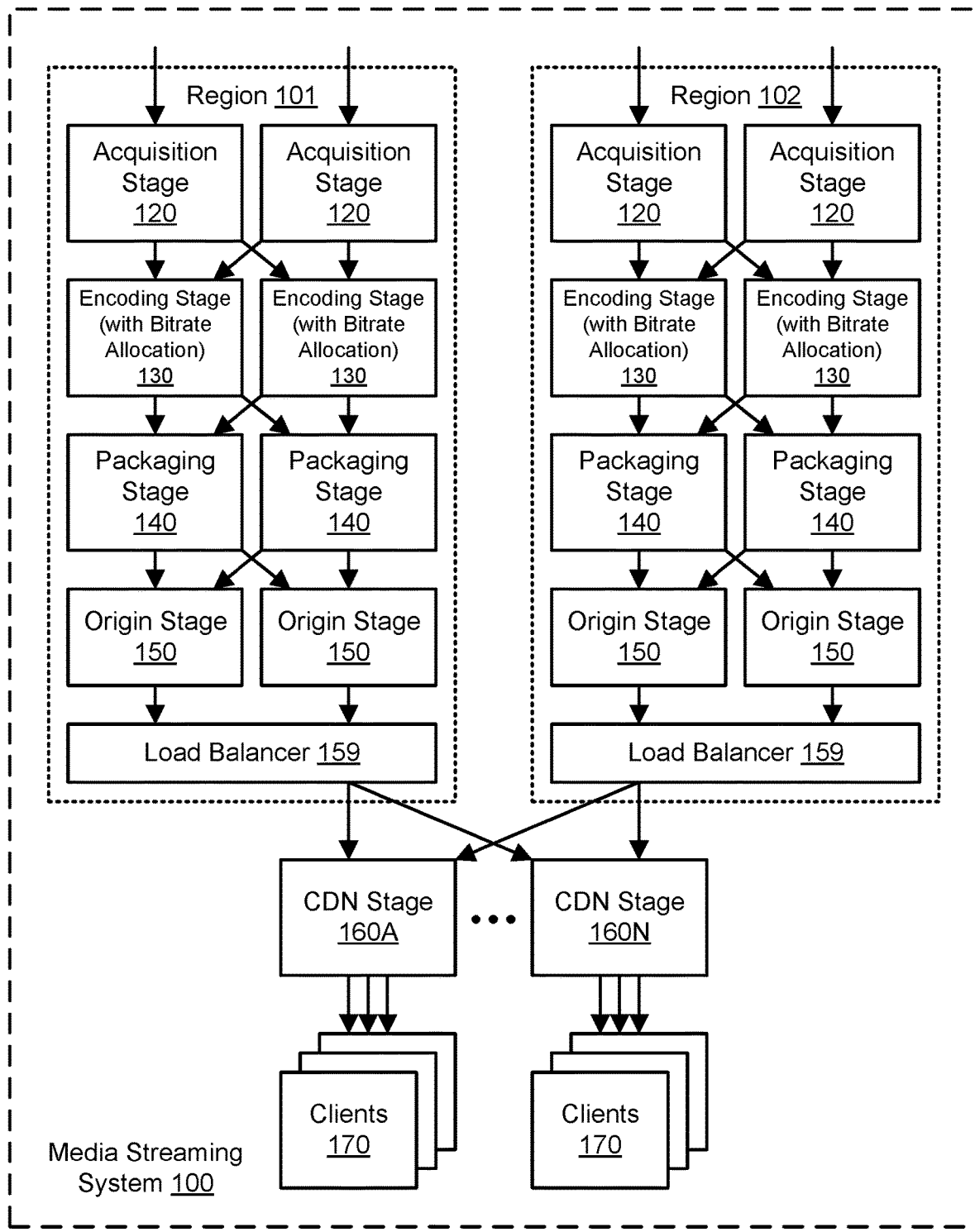
FIG. 2 illustrates further aspects of the example system environment for bitrate allocation for a multichannel media stream, including redundant pipeline components in multiple regions, according to one embodiment.

FIG. 2 illustrates further aspects of the example system environment for bitrate allocation for a multichannel media stream, including redundant components of stages, according to one embodiment. As discussed above, at least some of the stages 120, 130, 140, 150, and 160 may include redundant components (also referred to herein as instances) that collectively provide the functionality of the particular stage. The redundancy of components in the same stage may permit the pipeline to be rerouted to bypass a problematic component in that stage. As shown in the example of FIG. 2, the media streaming system 100 may be divided into multiple regions such as region 101 and region 102. The different regions 101 and 102 may represent different zones within a provider network whose resources are used to implement the media streaming system 100. The different regions 101 and 102 may represent geographical divisions of underlying components, including different nations, states, political subdivisions, continents, arbitrary zones, or data centers. Each of the regions 101 and 102 may implement a media delivery pipeline with multiple stages. Within each region, a particular stage may be implemented with redundancy. For example, multiple components operating in parallel may implement the acquisition stage 120, the encoding stage (including bitrate allocation) 130, the packaging stage 140, and the origin stage 150 within each region. As illustrated in FIG. 2, the redundant components within a stage in a particular zone may also implement redundancy with respect to the connections to components in the previous stage and/or in the next stage. Each of the regions 101 and 102 may also include a load balancer fleet 159. The load balancers 159 may efficiently distribute requests between the origin state 150 and the CDN stage, as represented by CDN components 160A-160N. The CDN stage 160A-160N may respond to requests for streaming media from clients 170. As discussed above, the media streaming system 100 may typically have many clients 170 per CDN server and many CDN servers per origin server.

Figure 3:
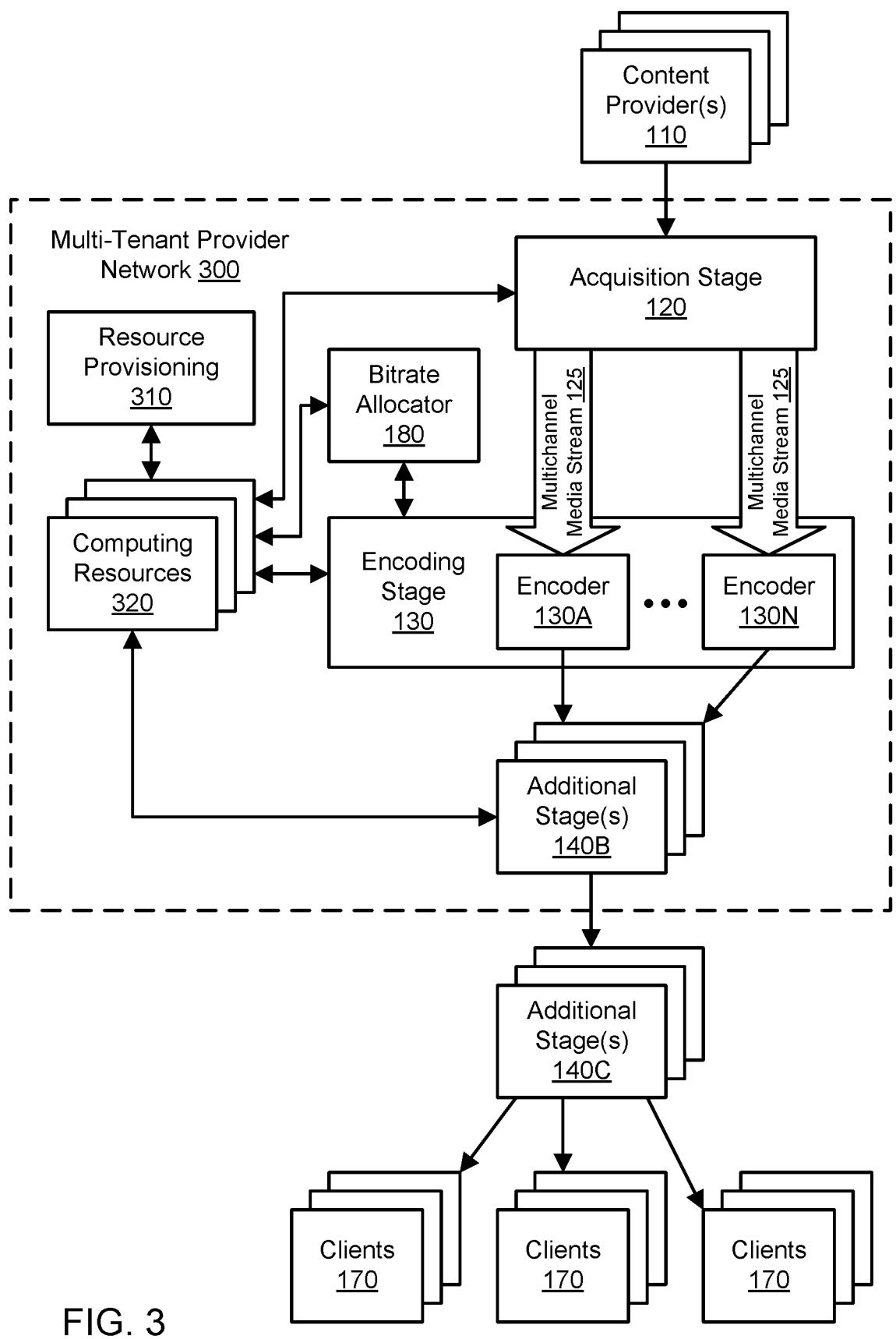
FIG. 3 illustrates further aspects of the example system environment for bitrate allocation for a multichannel media stream, including the implementation of components using computing resources provisioned from a multi-tenant provider network, according to one embodiment.

FIG. 3 illustrates further aspects of the example system environment for bitrate allocation for a multichannel media stream, including the implementation of components using computing resources provisioned from a multi-tenant provider network, according to one embodiment. As discussed above with respect to FIG. 1, the media streaming system 100 may be implemented using one or more computing resources, such as virtual compute instances or physical compute instances, that are provisioned from a provider network 300. In one embodiment, different components (including redundant components within a stage) of the media streaming system 100 may be implemented using different compute instances. The provider network 300 may offer multi-tenancy such that computing resources from a pool 320 may be shared by multiple clients of the provider network at any given time.

The computing resources 320 may include compute instances, storage instances, database instances, and so on. A resource provisioning functionality 310 in the multi-tenant provider network 300 may provision and deprovision resources in the pool 320 on behalf of clients. A computing resource from the pool 320 may be provisioned by selecting any appropriate type of resource, making it available to a particular client at a particular time, and potentially configuring the resource (e.g., with operating system software for a compute instance) to meet the requirements of the client. The client may then operate the provisioned resource based on the client's agreement with the provider network, e.g., on an hourly basis for a fee. When a resource is deprovisioned and returned to the pool 320 of available resources, another client may then provision and use that resource.

Various components of the pipeline, such as encoders 130A-130N that process a multichannel media stream 125, may be provisioned using resources of the provider network. One or more servers that implement the bitrate allocator 180 may also be provisioned using resources of the provider network. As shown in the example of FIG. 3, an acquisition stage 120 and one or more additional pipeline stages 140B may be implemented using the resources of the provider network 300, while one or more other pipeline stages 140C may be implemented outside of the provider network. For example, packagers in a packaging stage may be implemented inside the provider network 300, while origin servers and content delivery network (CDN) servers may be implemented outside the provider network.

Figure 4:
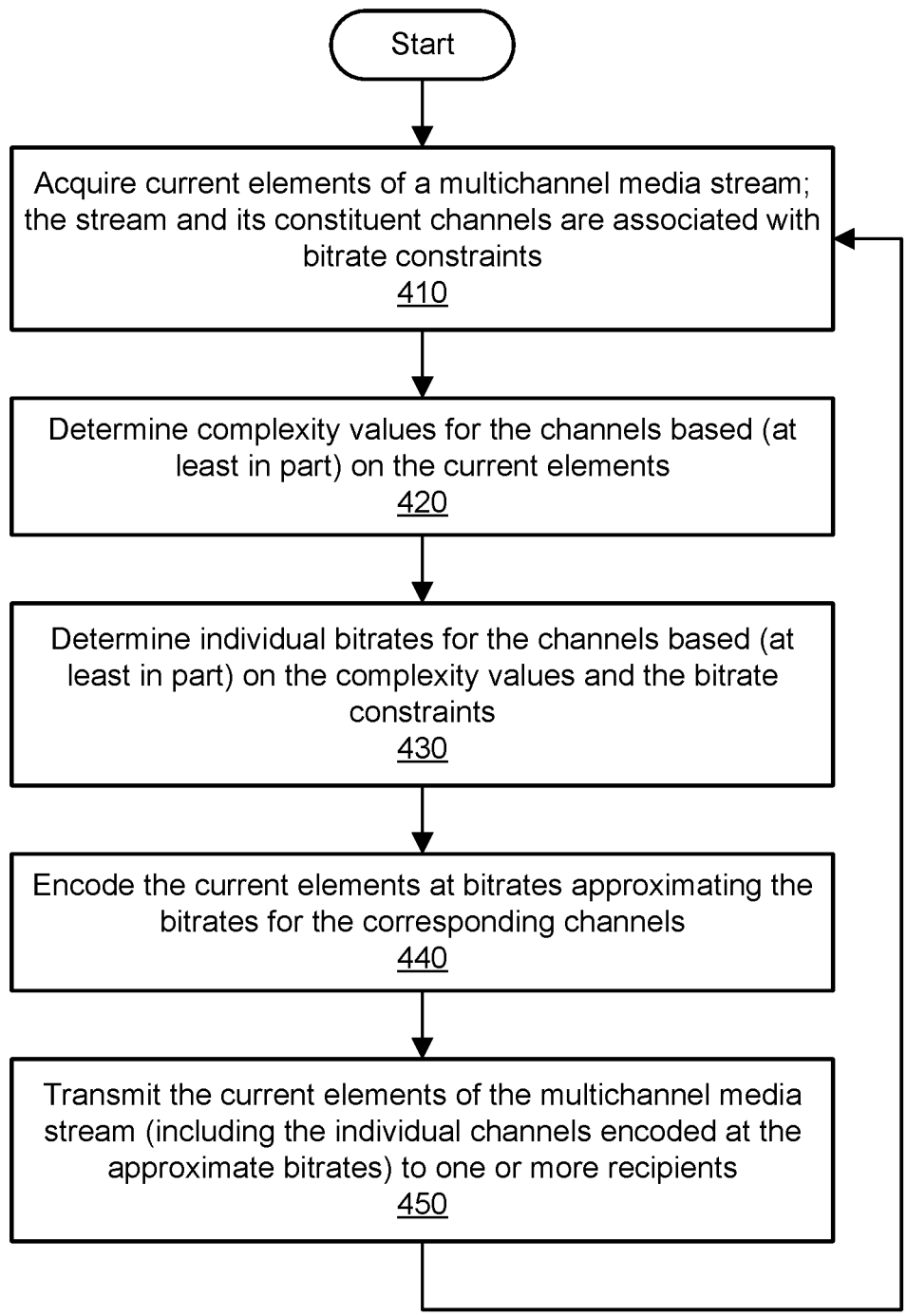
FIG. 4 is a flowchart illustrating a method for bitrate allocation for a multichannel media stream, according to one embodiment.

FIG. 4 is a flowchart illustrating a method for bitrate allocation for a multichannel media stream, according to one embodiment. As shown in 410, a multichannel media stream may be acquired, e.g., by one or more components of a media streaming system from one or more content providers. The multichannel media stream may include a plurality of channels. A channel may include digital media such as video, audio, video with audio, textual content (e.g., subtitles, closed captioning data, or annotations), and/or overhead data. The multichannel media stream may be implemented as a multi-program transport stream (MPTS), e.g., a stream containing multiple programs of MPEG video. The channels in a stream may typically vary in content. The channels in a stream may vary in resolution (e.g., 4K, 1080P, 480P, and so on) and/or frame rate (e.g., 24 Hz, 60 Hz, and so on). The multichannel media stream may be associated with one or more bitrate constraints such as a maximum aggregate bitrate for the entire set of channels in the stream. Individual channels of the stream may be associated with bitrate constraints such as a minimum individual bitrate for a particular channel and a maximum individual bitrate for a particular channel. Individual channels of the stream may also be associated with other metrics, such as an average or nominal bitrate per channel. The minimum, maximum, and average individual bitrates may vary from channel to channel. The bitrate constraints and other potential metadata associated with the stream and its constituent channels may be provided to the media streaming system by the content provider(s). Acquiring the multichannel media stream may include acquiring current elements of the stream, such as one or more frames of digital media for any of the channels in the stream.

Subject to the bitrate constraints, the individual bitrates for the individual channels in the stream may be optimized. As shown in 420, complexity values may be determined for the individual channels. The complexity values may be determined based (at least in part) on contents of frames of the individual channels, where those frames occur during a particular window of time or time slice. One or more frames of digital media content of a particular channel may be analyzed to determine a complexity value (or other complexity-based metric) for that channel, where at least one of the analyzed frames exists during the window of time. The window of time may open when the front edge of a particular frame is received and may close at the end of the particular frame, but one or more later frames may also be included in the analysis. A sequence of frames may be held in a lookahead buffer (e.g., a buffer holding one or two seconds of frames) to enable such an analysis. The complexity value may estimate a visual or graphical complexity of the channel during the window of time. A complexity value may be based (at least in part) on the degree of change from frame to frame. A complexity value may tend to be larger for a channel that is more visually complex and/or more dynamic, and a complexity value may tend to be smaller for a channel that is less visually complex and/or more static. For example, video of a news broadcast or talk show may often be less complex and less dynamic than video of a sporting event that features fast-moving elements and/or fast panning of the camera. In one embodiment, a complexity value may be determined as approximate bits per pixel at minimum Quantization Parameter (QP) times 64K. In one embodiment, a minimum complexity value may represent one bit per macroblock. In one embodiment, a maximum complexity value may represent about 4 bits per pixel, or 256K, e.g., for random input. The complexity value may include a numeral, e.g., an integer.

As shown in 430, individual bitrates may be determined for the individual channels based (at least in part) on the complexity values. The individual bitrates may also be determined based (at least in part) on the bitrate constraints. In one embodiment, the sum of the individual bitrates may not exceed the maximum aggregate bitrate for the set of channels in the stream plus some predetermined threshold (e.g., a raw value such as an integer or a percentage) beyond that bitrate. Additionally, the individual bitrate for a particular channel may fall between the minimum individual bitrate and the maximum individual bitrate of the corresponding channel (e.g., may be greater than or equal to the minimum and less than or equal to the maximum), potentially also within some predetermined threshold (e.g., a raw value such as an integer or a percentage) beyond those bitrates. In one embodiment, the individual bitrates may also be determined based (at least in part) on the average or nominal bitrates for the channels. Any suitable technique may be used to determine the individual bitrates of the channels. For example, as discussed further with respect to FIG. 5, an iterative process using a binary search technique may be employed to find individual bitrates whose sum is sufficiently close to (and does not exceed) the maximum aggregate bitrate while respecting the bitrate constraints for individual channels. An alternative bitrate allocation technique is discussed with respect to FIG. 7.

As shown in 440, the individual channels may be encoded at bitrates that approximate the corresponding individual bitrates. In one embodiment, the operation shown in 420 may be performed by one or more encoders, and the operation shown in 430 may be performed by a bitrate allocator which provides the determined bitrates to the one or more encoders. The one or more encoders may then compress or otherwise transform one or more of the channels in the stream to match the individual bitrates associated with those channels. The process of encoding a channel at a particular bitrate may attempt to reach the target bitrate as an average bitrate over some duration, potentially as brief as one frame; however, it is contemplated that encoding at the exact bitrate may not be achieved, and thus the channels may be encoded at bitrates that approximate those determined by the bitrate allocator. Encoding the channels may include encoding the current elements of the stream, such as one or more frames of digital media for any of the channels in the stream.

As shown in 450, the multichannel media stream may be transmitted to one or more recipients, e.g., using components of a media streaming system. In the stream being transmitted to the recipient(s), the individual channels may be encoded at the corresponding individual bitrates. In one embodiment, a recipient may select one or more of the channels in the stream for viewing or processing. Transmitting the channels may include transmitting the current elements of the stream, such as one or more frames of digital media for any of the channels in the stream. As shown in FIG. 4, the method may return to the operation shown in 410 for additional cycles of bitrate allocation for subsequent elements (e.g., frames) of the channels. In this manner, the bitrates for a set of channels may not only be optimized within bitrate constraints but may also adapt over time as the content changes within those channels.

Figure 5:
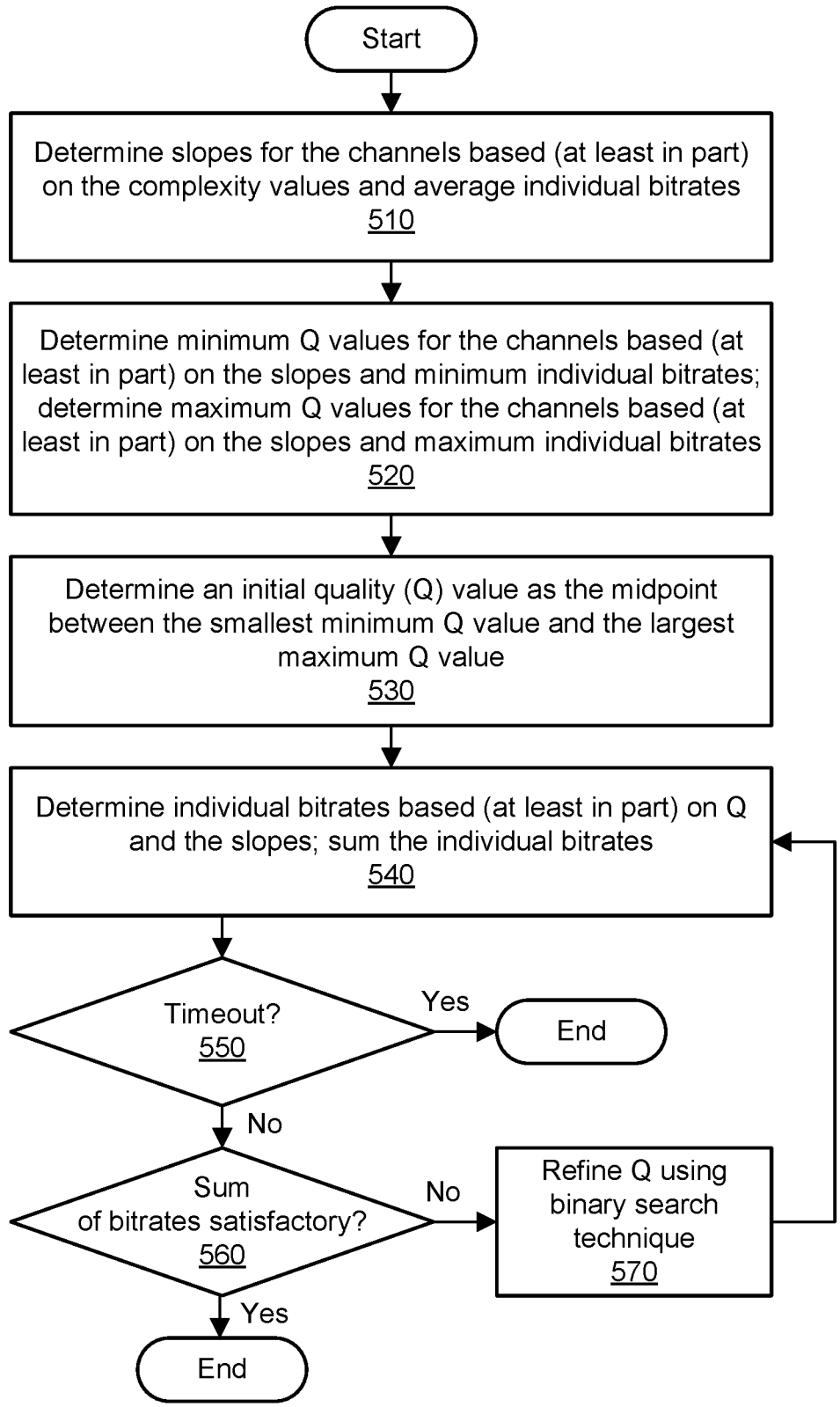
FIG. 5 is a flowchart illustrating further aspects of the method for bitrate allocation for a multichannel media stream, including an iterative process of refinement using a binary search, according to one embodiment.

FIG. 5 is a flowchart illustrating further aspects of the method for bitrate allocation for a multichannel media stream, including an iterative process of refinement using a binary search, according to one embodiment. As noted above, an iterative process using a binary search technique may be employed to find individual bitrates whose sum is sufficiently close to (and does not exceed) the maximum aggregate bitrate while respecting the bitrate constraints for individual channels. The operations shown in FIG. 5 represent an implementation of the operation shown in 430, according to one embodiment.

Figure 6A:
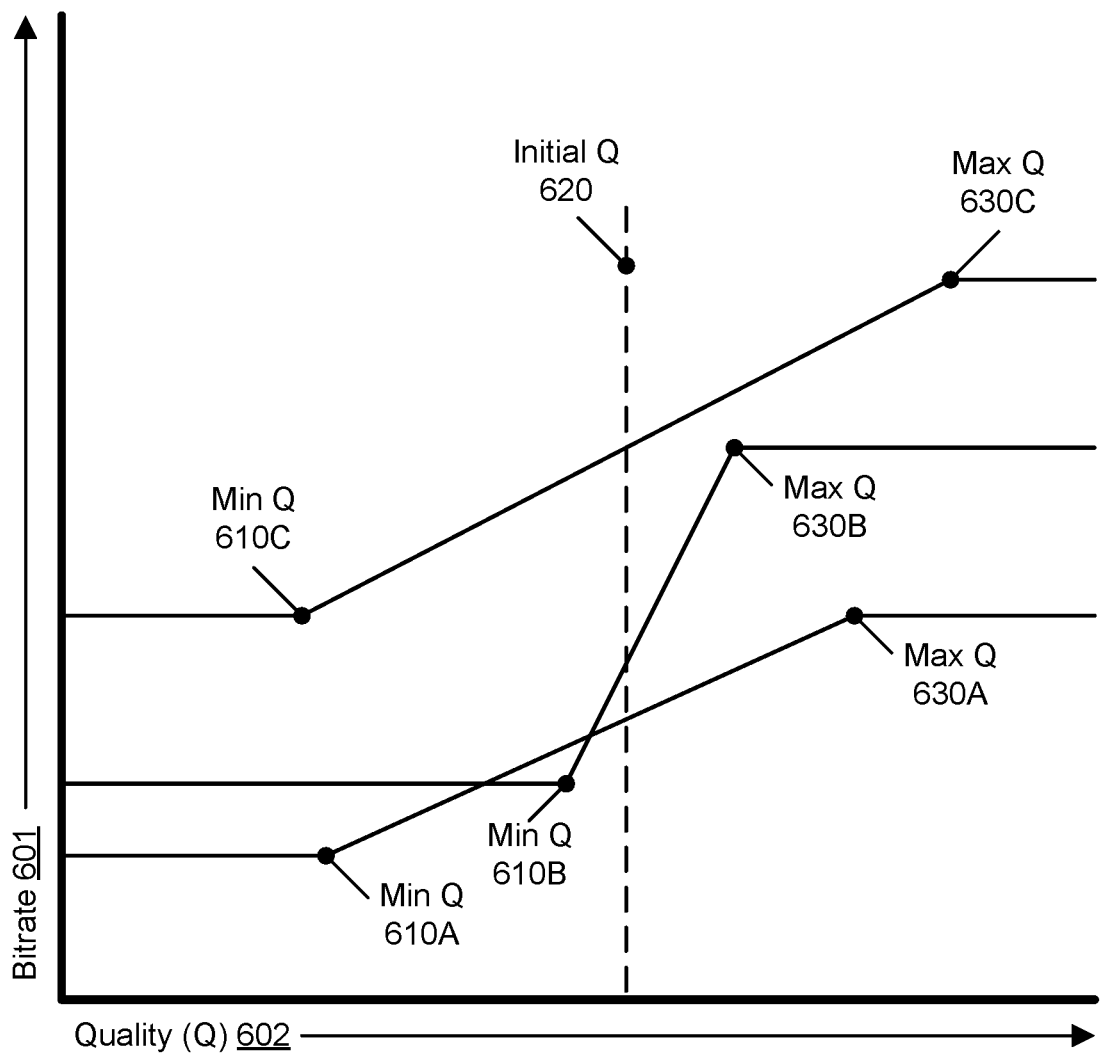
FIG. 6A, FIG. 6B, and FIG. 6C are example graphs showing bitrate allocation across multiple channels, according to one embodiment.

As shown in 510, individual slopes may be determined for the individual channels in the stream. The slopes may be determined based (at least in part) on the complexity values and the average individual bitrates for the corresponding channel. For example, for a particular channel, the slope may be calculated as the product of the complexity value and the average individual bitrates. Examples of slopes are shown in FIG. 6A.

As shown in 520, minimum individual quality (Q) values may be determined for the individual channels. The minimum Q values may be determined based (at least in part) on the minimum individual bitrates and the individual slopes. For example, for a particular channel, the minimum Q may be calculated as the minimum individual bitrate divided by the slope. As also shown in 520, maximum individual quality (Q) values may be determined for the individual channels. The maximum Q values may be determined based (at least in part) on the maximum individual bitrates and the individual slopes. For example, for a particular channel, the maximum Q may be calculated as the maximum individual bitrate divided by the slope. The minimum and maximum Q values may act as boundaries for individual channels when seeking individual bitrates. Examples of minimum Q values and maximum Q values are shown in FIG. 6A.

As shown in 530, an initial quality (Q) value may be determined that is applicable to the entire set of channels. The initial Q value may fall within the minimum individual Q values and the maximum individual Q values for the individual channels. In one embodiment, the initial Q value may be determined as the midpoint between a smallest one of the minimum individual Q values and a largest one of the maximum individual Q values.

As shown in 540, the individual bitrates for the individual channels may be determined based at least in part on the quality value and the individual slopes. For example, for a particular channel, the bitrate may be calculated as a product of the Q value (applicable to all the channels) and the slope for the particular channel. As also shown in 540, the individual bitrates for the channels may be summed to calculate the total or aggregate bitrate for the multichannel media stream.

The Q value may be determined iteratively based (at least in part) on a binary search. The operation shown in 540 may represent the initial iteration of the binary search, and the initial Q value may be refined one or more times in subsequent iterations of the binary search. As shown in 550, it may be determined whether the bitrate allocation process has timed out. A timeout may occur after a particular number of iterations have been performed or after a particular duration of time has elapsed in the bitrate allocation process. If a timeout occurs, the current set of individual bitrates may be output, e.g., to one or more encoders. Otherwise, the bitrate allocation process may determine whether the sum of the individual bitrates is satisfactory, as shown in 560. The sum (e.g., the aggregate bitrate) may be considered satisfactory if it does not exceed the maximum aggregate bitrate for the set of channels beyond some predetermined threshold and also if it is sufficiently close to the maximum aggregate bitrate (e.g., within some predetermined threshold). When the sum is within a predetermined threshold value of the maximum aggregate bitrate without exceeding that bitrate, the bitrate allocation process may end; the current set of individual bitrates may be output, e.g., to one or more encoders. A satisfactory aggregate bitrate may typically be found within twenty iterations.

If the sum of the bitrates is not satisfactory, then the Q value may be refined using a binary search technique, as shown in 570. If the sum of the bitrates is larger than the maximum aggregate bitrate, then the binary search may use the old Q value as the new maximum Q value and determine a new Q value as the midpoint between the minimum Q value and the old Q value. If the sum of the bitrates is too small (e.g., not within a predetermined threshold of the maximum aggregate bitrate), then the binary search may use the old Q value as the new minimum Q value and determine a new Q value as the midpoint between the old Q value and the maximum Q value. The bitrate allocation process may proceed with the operations shown in 540, 550, and potentially 560 to determine whether to output the new individual (per-channel) bitrates or continue to refine them.

Figure 6B:
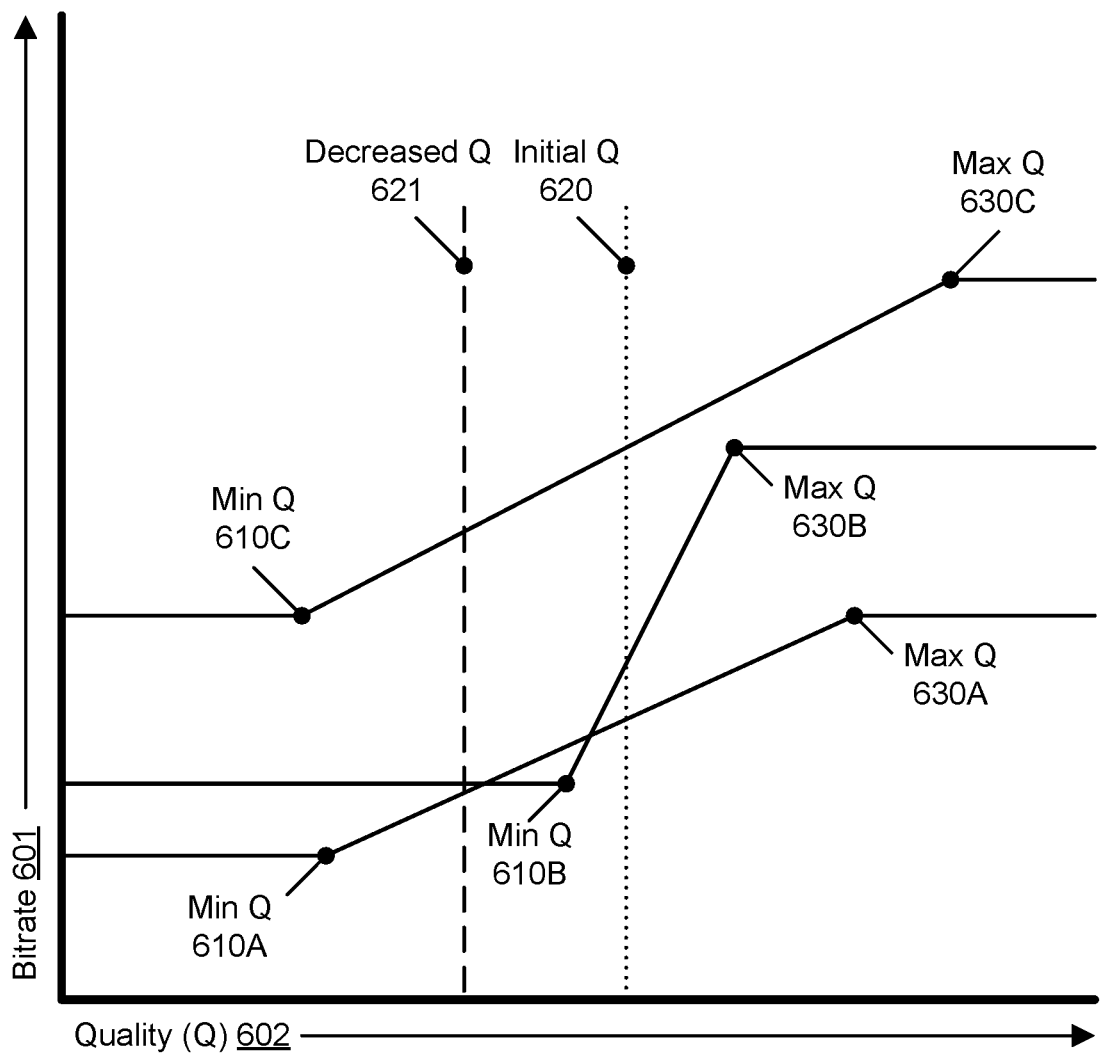
Figure 6C:
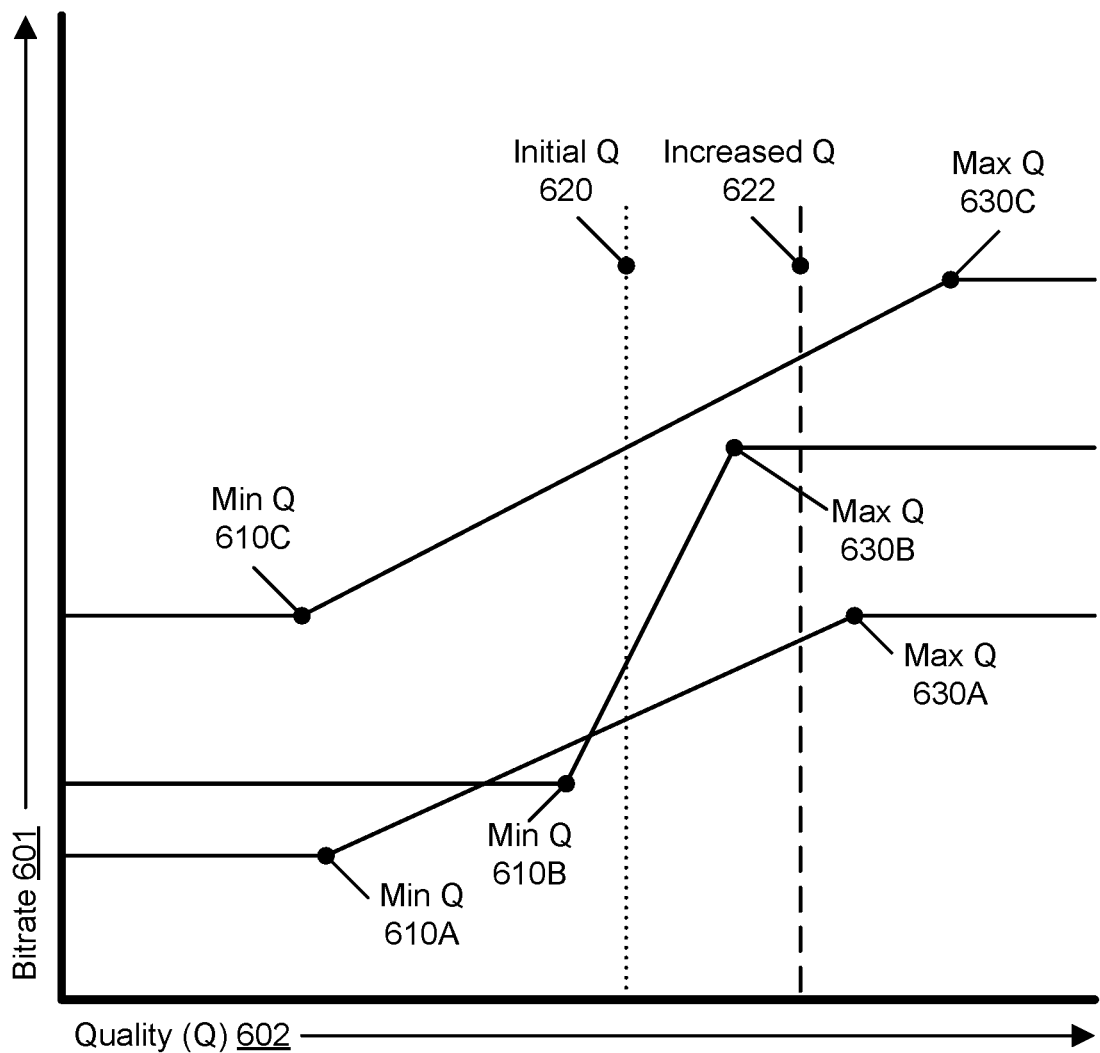

FIG. 6A, FIG. 6B, and FIG. 6C are example graphs showing bitrate allocation across multiple channels, according to one embodiment. FIG. 6A shows an example Cartesian graph, with the vertical axis representing bitrates 601 and the horizontal axis representing the quality (Q) values 602. As discussed above, minimum and maximum Q values may be determined based (at least in part) on the per-channel bitrate constraints and the individual slopes. For example, for a particular channel, the minimum Q may be calculated as minimum individual bitrate divided by the slope, and the maximum Q may be calculated as maximum individual bitrate divided by the slope. The minimum and maximum Q values may act as boundaries for individual channels when seeking individual bitrates. As shown in the example of FIG. 6A, a first channel may have a minimum Q value 610A and a maximum Q value 630A, a second channel may have a minimum Q value 610B and a maximum Q value 630B, and a third channel may have a minimum Q value 610C and a maximum Q value 630C. The slope for a channel is visualized as the line between the minimum and maximum Q values for that channel. Although three channels are shown for purposes of illustration and example, the bitrate allocation process described herein may also be used with other numbers of channels and other bitrate constraints.

As shown in FIG. 6A, an initial Q value 620 may be calculated at the midpoint of the smallest minimum Q value 610C and the largest maximum Q value 630C. As discussed above, the individual bitrates for the individual channels may be determined based at least in part on the quality value and the individual slopes. For example, for a particular channel, the bitrate may be calculated as a product of the Q value 620 and the slope for the particular channel. The various bitrates for the channels may be determined based on the points where the initial Q line 620 intersects the various lines for the channels in the graph. The individual bitrates for the channels may be summed to calculate the total or aggregate bitrate for the multichannel media stream. The Q value 620 may be refined, e.g., using a binary search technique, until the aggregate bitrate is deemed close enough to maximum aggregate bitrate.

The Q value may be reduced in a subsequent iteration if the initial Q value 620 resulted in a total bitrate (across all the channels) that was too large. If the sum of the bitrates is larger than the maximum aggregate bitrate, then the binary search may use the old Q value as the new maximum Q value and determine a new Q value as the midpoint between the minimum Q value and the old Q value. As shown in the example of FIG. 6B, a decreased Q value 621 may be placed at the midpoint between the smallest individual minimum Q value 610C and the initial Q value 620. The various bitrates for the channels may be determined based on the points where the new Q line 621 intersects the various lines for the channels in the graph. The second channel may be capped at the minimum bitrate represented by the minimum individual Q value 610B.

Alternatively, the Q value may be increased in a subsequent iteration if the initial Q value 620 resulted in a total bitrate (across all the channels) that was too small. If the sum of the bitrates is too small (e.g., not within a predetermined threshold of the maximum aggregate bitrate), then the binary search may use the old Q value as the new minimum Q value and determine a new Q value as the midpoint between the old Q value and the maximum Q value. As shown in the example of FIG. 6C, an increased Q value 622 may be placed at the midpoint between the initial Q value 620 and the largest individual maximum Q value 630C. The various bitrates for the channels may be determined based on the points where the new Q line 622 intersects the various lines for the channels in the graph. The second channel may be capped at the maximum bitrate represented by the maximum individual Q value 630B.

Figure 7:
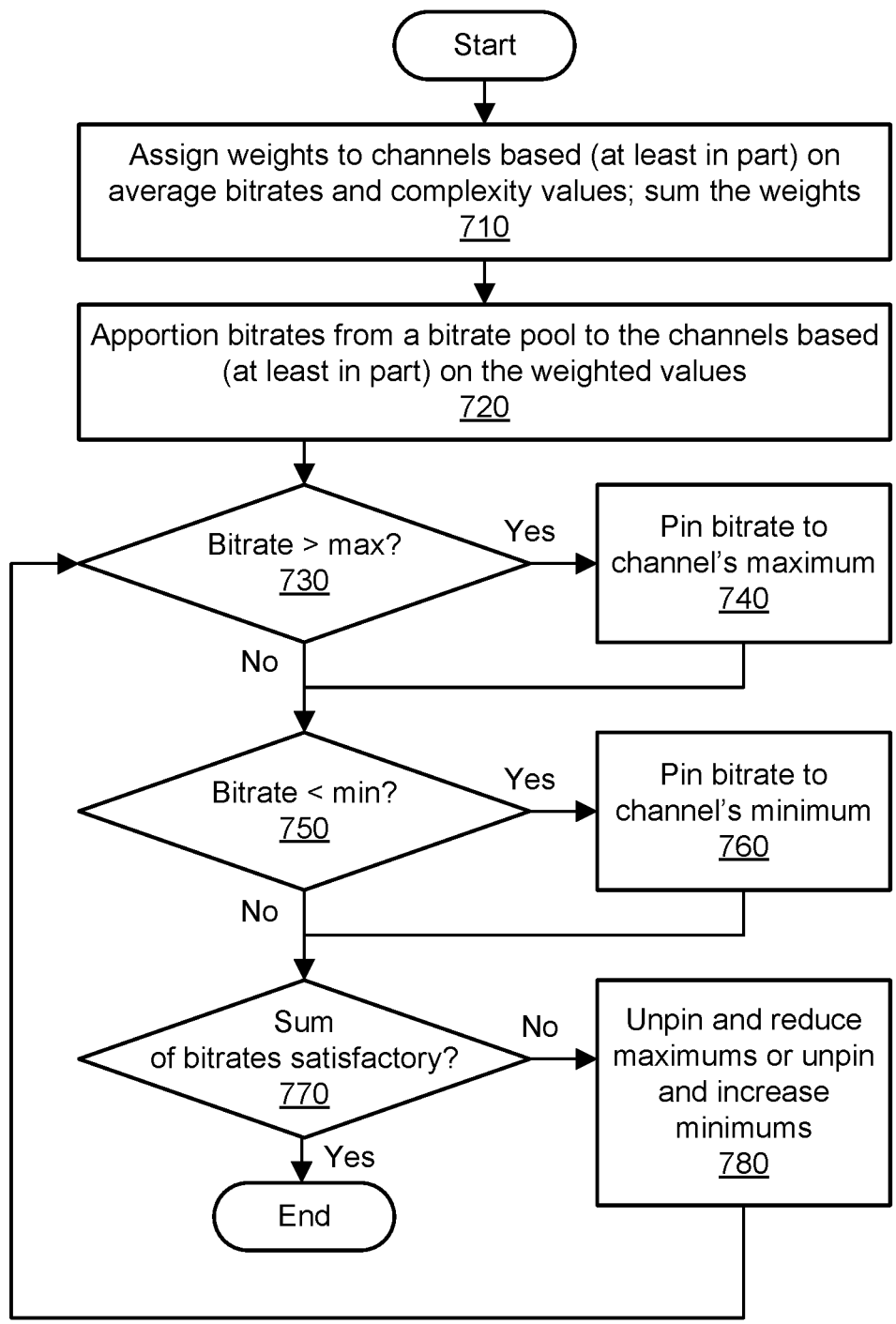
FIG. 7 is a flowchart illustrating further aspects of the method for bitrate allocation for a multichannel media stream, including an iterative bitrate allocation process, according to one embodiment.

FIG. 7 is a flowchart illustrating further aspects of the method for bitrate allocation for a multichannel media stream, including an iterative bitrate allocation process, according to one embodiment. As shown in 710, a set of one or more elements (e.g., a frame) for a channel under consideration is assigned a weight. This weight value may be calculated as the complexity value for the channel multiplied by the average bitrate for the channel. As also shown in 710, the weighted values for the channels may be summed together. As shown in 720, a bitrate pool having the maximum aggregate bitrate is apportioned to the channels based (at least in part) on their weighted values, such that bitrates are assigned to the channels by comparing the channel's weighted value with the sum of the weighted values.

As shown in 730, it may be determined if the bitrate assigned to a channel is larger than the channel's individual maximum bitrate. If so, then as shown in 740, the channel's bitrate is "pinned" to its individual maximum, and the channel may be eliminated from any additional consideration. As shown in 750, it may be determined if the bitrate assigned to a channel is smaller than the channel's individual minimum bitrate. If so, then as shown in 760, the channel's bitrate is "pinned" to its individual minimum, and the channel may be eliminated from any additional consideration.

As shown in 770, it may be determined whether the bitrate allocation is satisfactory and can end. The bitrate allocation process may be considered satisfactory if the entire bitrate pool (or a sufficiently large percentage) has been allocated to the individual channels and if the most recent iteration has not resulted in any "pinned" channels. If so, then the per-channel bitrates may be output, e.g., to one or more encoders. If not, then the process of refinement may continue. As shown in 780, if too many bits were allocated (e.g., such that the sum is larger than the maximum aggregate bitrate), then one or more of the "pinned" maximums may be "unpinned" and reduced. Similarly, if too few bits were allocated (e.g., such that the sum is smaller than the maximum aggregate bitrate), then one or more of the "pinned" minimums may be "unpinned" and increased.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement a media streaming system, wherein the media streaming system is configured to:
   acquire a multichannel media stream, wherein the multichannel media stream comprises a plurality of channels, wherein the multichannel media stream is associated with a maximum aggregate bitrate for the plurality of channels, and wherein individual channels of the plurality of channels are associated with minimum individual bitrates, maximum individual bitrates, and average individual bitrates;
   during a window of time, determine complexity values for the individual channels based at least in part on contents of frames of the individual channels;
   determine individual slopes or weighted values for the individual channels of the plurality of channels of the multichannel media stream based at least in part on the complexity values and the average individual bitrates;
   determine individual bitrates for the individual channels of the plurality of channels of the multichannel media stream based at least in part on one of either the individual slopes or the weighted values for the individual channels of the plurality of channels of the multichannel media stream, and based at least in part on the complexity values for the individual channels of the plurality of channels of the multichannel media stream, wherein a sum of the individual bitrates does not exceed the maximum aggregate bitrate for the plurality of channels beyond a predetermined threshold, wherein the individual bitrates do not fall below the minimum individual bitrates of the corresponding individual channels, and wherein the individual bitrates do not exceed the maximum individual bitrates of the corresponding individual channels;
   encode the individual channels at bitrates that approximate the corresponding individual bitrates; and
   transmit the multichannel media stream with the individual channels encoded at the bitrates that approximate the corresponding individual bitrates.

2. The system as recited in claim 1, wherein the media streaming system is further configured to:
   determine the individual slopes for the individual channels based at least in part on the complexity values and the average individual bitrates;
   determine minimum individual quality values for the individual channels based at least in part on the minimum individual bitrates and the individual slopes;
   determine maximum individual quality values for the individual channels based at least in part on the maximum individual bitrates and the individual slopes; and
   determine a quality value applicable to the individual channels, wherein the quality value falls within the minimum individual quality values and the maximum individual quality values for the individual channels, and wherein the individual bitrates for the individual channels are determined based at least in part on the quality value and the individual slopes.

3. The system as recited in claim 2, wherein the quality value is determined iteratively based at least in part on a binary search, wherein an initial quality value at an initial iteration of the binary search is determined as the midpoint between a smallest one of the minimum individual quality values and a largest one of the maximum individual quality values, and wherein the initial quality value is refined one or more times in subsequent iterations of the binary search.

4. The system as recited in claim 1, wherein the media streaming system is further configured to:

determine the weighted values for the individual channels based at least in part on the complexity values and the average individual bitrates; and wherein the individual bitrates for the individual channels are determined using allocation of portions of the maximum aggregate bitrate based at least in part on the weighted values.

5. A computer-implemented method, comprising:
performing, by one or more computing devices that implement a media streaming system:
determining complexity values for individual channels of a set of channels of streaming media, wherein the complexity values are determined based at least in part on frames of the individual channels during a window of time, wherein the set of channels is associated with a maximum aggregate bitrate, and wherein the individual channels are associated with bitrate constraints including average individual bitrates;
determining individual slopes or weighted values for the individual channels of the set of channels of the streaming media based at least in part on the complexity values and the average individual bitrates; and
determining individual bitrates for the individual channels of the set of channels of the streaming media based at least in part on one of either the individual slopes or the weighted values for the individual channels of the set of channels of the streaming media, and based at least in part on the complexity values for the individual channels of the set of channels of the streaming media, wherein a sum of the individual bitrates does not exceed the maximum aggregate bitrate for the set of channels beyond a first predetermined threshold, and wherein the individual bitrates do not violate the bitrate constraints of the corresponding individual channels beyond a second predetermined threshold; and
wherein the individual channels are transmitted to one or more recipients at bitrates that approximate the corresponding individual bitrates.

6. The method as recited in claim 5, wherein the bitrate constraints comprise minimum individual bitrates and maximum individual bitrates, and wherein the method further comprises performing, by the one or more computing devices that implement the media streaming system:
determining the individual slopes for the individual channels based at least in part on the complexity values and the average individual bitrates;
determining minimum individual quality values for the individual channels based at least in part on the minimum individual bitrates and the individual slopes;
determining maximum individual quality values for the individual channels based at least in part on the maximum individual bitrates and the individual slopes; and
determining a quality value applicable to the individual channels, wherein the quality value falls within the minimum individual quality values and the maximum individual quality values for the individual channels, and wherein the individual bitrates for the individual channels are determined based at least in part on the quality value and the individual slopes.

7. The method as recited in claim 6, wherein the quality value is determined iteratively based at least in part on a binary search.

8. The method as recited in claim 7, wherein an initial quality value at an initial iteration of the binary search is determined as the midpoint between a smallest one of the minimum individual quality values and a largest one of the maximum individual quality values, and wherein the initial quality value is refined one or more times in subsequent iterations of the binary search.

9. The method as recited in claim 5, wherein the method further comprises performing, by the one or more computing devices that implement the media streaming system:
determining the weighted values for the individual channels based at least in part on the complexity values and the average individual bitrates; and
wherein the individual bitrates for the individual channels are determined using allocation of portions of the maximum aggregate bitrate based at least in part on the weighted values.

10. The method as recited in claim 5, wherein the method further comprises performing, by the one or more computing devices that implement the media streaming system:
sending the individual bitrates for the individual channels from a bitrate allocator to one or more encoders, wherein the individual channels are encoded at the bitrates that approximate the corresponding individual bitrates using the one or more encoders.

11. The method as recited in claim 5, wherein the complexity values comprise a first complexity value for a first channel of the set of channels and a second complexity value for a second channel of the set of channels, wherein one or more frames of the first channel exhibit a greater visual complexity than one or more frames of the second channel during the window of time, wherein the first complexity value is larger than the second complexity value, and wherein a larger bitrate is allocated to the first channel based at least in part on the greater visual complexity.

12. The method as recited in claim 5, wherein the individual channels are packaged into a multichannel media stream prior to being transmitted to the one or more recipients.

13. A computer-readable storage medium storing program instructions computer-executable to perform:
determining complexity values for individual channels of a set of channels of a multichannel media stream, wherein the complexity values are determined based at least in part on frames of the individual channels during a window of time, wherein the multichannel media stream is associated with a maximum aggregate bitrate, and wherein the individual channels are associated with minimum individual bitrates, maximum individual bitrates, and average individual bitrates;
determining individual slopes or weighted values for the individual channels of the set of channels of the multichannel media stream based at least in part on the complexity values and the average individual bitrates; and
determining individual bitrates for the individual channels of the set of channels of the multichannel media stream based at least in part on one of either the individual slopes or the weighted values for the individual channels of the set of channels of the multichannel media stream, and based at least in part on the complexity values for the individual channels of the set of channels of the multichannel media stream, wherein a sum of the individual bitrates does not exceed the maximum aggregate bitrate for the multichannel media stream beyond a predetermined threshold, wherein the individual bitrates do not fall below the minimum individual bitrates of the corresponding individual channels, and wherein the individual bitrates do not exceed the maximum individual bitrates of the corresponding individual channels; and wherein the individual channels are transmitted at bitrates approximating the corresponding individual bitrates.

14. The computer-readable storage medium as recited in claim 13, wherein the program instructions are further computer-executable to perform:

determining the individual slopes for the individual channels based at least in part on the complexity values and the average individual bitrates;

determining minimum individual quality values for the individual channels based at least in part on the minimum individual bitrates and the individual slopes;

determining maximum individual quality values for the individual channels based at least in part on the maximum individual bitrates and the individual slopes; and determining a quality value applicable to the individual channels, wherein the quality value falls within the minimum individual quality values and the maximum individual quality values for the individual channels, and wherein the individual bitrates for the individual channels are determined based at least in part on the quality value and the individual slopes.

15. The computer-readable storage medium as recited in claim 14, wherein the quality value is determined iteratively based at least in part on a binary search.

16. The computer-readable storage medium as recited in claim 15, wherein an initial quality value at an initial iteration of the binary search is determined as the midpoint between a smallest one of the minimum individual quality values and a largest one of the maximum individual quality values, and wherein the initial quality value is refined one or more times in subsequent iterations of the binary search.

17. The computer-readable storage medium as recited in claim 13, wherein the program instructions are further computer-executable to perform:

determining the weighted values for the individual channels based at least in part on the complexity values and the average individual bitrates; and wherein the individual bitrates for the individual channels are determined using allocation of portions of the maximum aggregate bitrate based at least in part on the weighted values.

18. The computer-readable storage medium as recited in claim 13, wherein the program instructions are further computer-executable to perform:

sending the individual bitrates for the individual channels from a bitrate allocator to one or more encoders, wherein the individual channels are encoded at the bitrates approximating the corresponding individual bitrates using the one or more encoders.

19. The computer-readable storage medium as recited in claim 13, wherein the complexity values comprise a first complexity value for a first channel of the multichannel media stream and a second complexity value for a second channel of the multichannel media stream, wherein one or more frames of the first channel exhibit a greater visual complexity than one or more frames of the second channel during the window of time, wherein the first complexity value is larger than the second complexity value, and wherein a larger bitrate is allocated to the first channel based at least in part on the greater visual complexity.

20. The computer-readable storage medium as recited in claim 13, wherein the multichannel media stream comprises a first channel and a second channel, and wherein the first channel differs from the second channel in resolution or frame rate.

\* \* \* \* \*